(12) United States Patent
Naim et al.

(10) Patent No.: US 10,117,257 B1
(45) Date of Patent: Oct. 30, 2018

(54) ESTIMATING UPLINK INTERFERENCE IN A WIRELESS NETWORK

(71) Applicant: Sprint Spectrum LP, Overland Park, KS (US)

(72) Inventors: Muhammad Ahsan Naim, Ashburn, VA (US); Luca Zappaterra, Eindhoven (NL); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 69 days.

(21) Appl. No.: 15/355,341

(22) Filed: Nov. 18, 2016

(51) Int. Cl.
*H04W 72/08* (2009.01)
*H04W 72/04* (2009.01)
*H04W 72/12* (2009.01)
*H04L 5/00* (2006.01)

(52) U.S. Cl.
CPC ......... *H04W 72/082* (2013.01); *H04L 5/0037* (2013.01); *H04W 72/042* (2013.01); *H04W 72/048* (2013.01); *H04W 72/0413* (2013.01); *H04W 72/1231* (2013.01); *H04W 72/1268* (2013.01)

(58) Field of Classification Search
CPC ........... H04W 72/082; H04W 72/0413; H04W 72/042; H04W 72/048; H04W 72/1231; H04W 72/1268
See application file for complete search history.

(56) References Cited

U.S. PATENT DOCUMENTS

| 9,019,905 | B2 | 4/2015 | Kazmi et al. | |
|---|---|---|---|---|
| 9,049,730 | B2 | 6/2015 | Vajapeyam et al. | |
| 2002/0044593 | A1* | 4/2002 | Kuo | H04B 1/7115 375/148 |
| 2002/0159514 | A1* | 10/2002 | Miyoshi | H04B 17/336 375/226 |
| 2003/0125038 | A1* | 7/2003 | Western | H04W 72/121 455/452.1 |
| 2006/0229092 | A1* | 10/2006 | Jia | H04W 76/14 455/517 |

* cited by examiner

*Primary Examiner* — Ronald B Abelson

(57) ABSTRACT

Estimating uplink interference includes determining any wireless devices having available uplink resources, and instructing the wireless devices to estimate and report uplink interference. A method for estimating uplink interference in a wireless network includes determining that a wireless device attached to an access node has available resources within an uplink schedule of the wireless device, and instructing the wireless device to enter a listening mode during the available resources of the uplink schedule. In the listening mode, the wireless device determines a measurement of an uplink interference caused at the wireless device. The method further includes receiving the measurement of the uplink interference from the wireless device via an uplink channel.

18 Claims, 5 Drawing Sheets

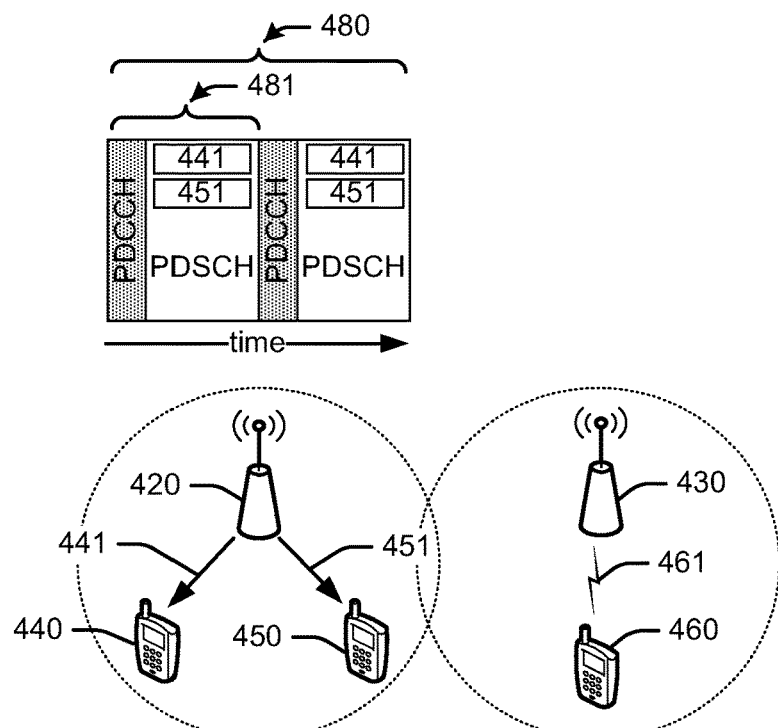
FIG. 4A - DOWNLINK
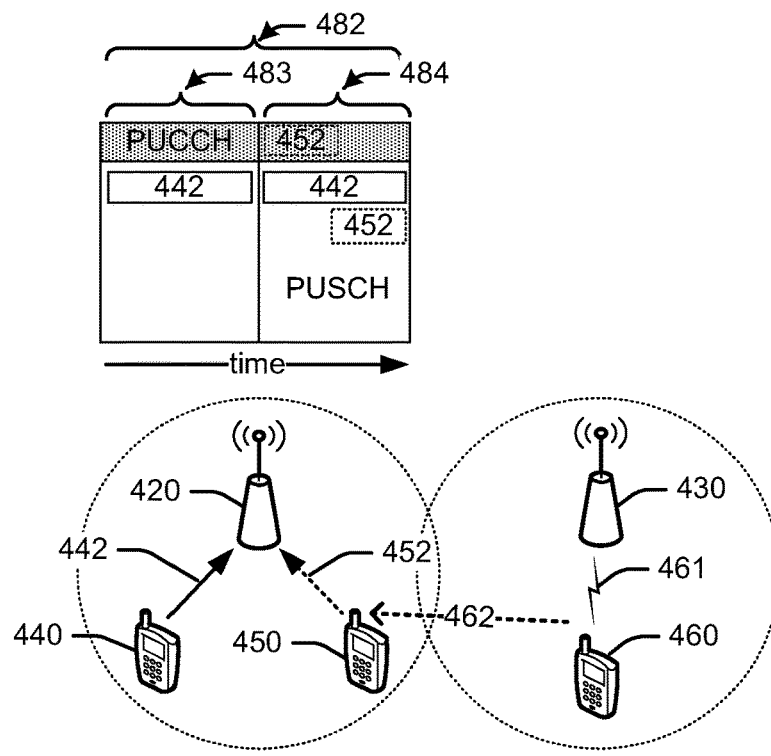
FIG. 4B - UPLINK

ESTIMATING UPLINK INTERFERENCE IN A WIRELESS NETWORK

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to deploy small access nodes throughout the coverage area of an access node. In a heterogeneous wireless network, macro access nodes along with several small access nodes may be configured to deploy multiple carriers within the same or different frequency bands. However, interference can arise as a result of utilizing the same frequency band. For example, wireless devices engaged in uplink transmissions can cause interference to other wireless devices and small access nodes utilizing the same frequency band, particularly if they are located in close proximity to one another.

OVERVIEW

Exemplary embodiments described herein include systems, methods, and nodes for estimating uplink by determining any wireless devices having available uplink resources, and instructing the wireless devices to estimate and report uplink interference. A method for estimating uplink interference in a wireless network includes determining that a wireless device attached to an access node has available resources within an uplink schedule of the wireless device, and instructing the wireless device to enter a listening mode during the available resources of the uplink schedule. In the listening mode, the wireless device determines a measurement of an uplink interference caused at the wireless device. The method further includes receiving the measurement of the uplink interference from the wireless device via an uplink channel.

A system for estimating uplink interference in a wireless network includes an access node, and a processor coupled to the access node. The processor configures the access node to perform operations including selecting one or more wireless devices for measuring an uplink interference at each wireless device of the one or more wireless devices, wherein the selection is based on an availability of uplink resources at said each wireless device, and receiving a measurement of uplink interference from each wireless device. Each wireless device determines the measurement of uplink interference by activating a downlink receiver during a portion of the uplink resources.

A processing node for estimating uplink interference in a wireless network is configured to perform operations including determining unused resources within an uplink subframe associated with a wireless device attached to an access node, instructing the wireless device to measure a received signal level during the uplink subframe, and receiving the signal level measured by the wireless device at the access node. The signal level corresponds to an interference at the wireless device.

BRIEF DESCRIPTION OF THE DRAWINGS

FIGS. 4A-4B depict an exemplary small access node for estimating uplink interference from a neighboring small access node.

DETAILED DESCRIPTION

Figure 1:
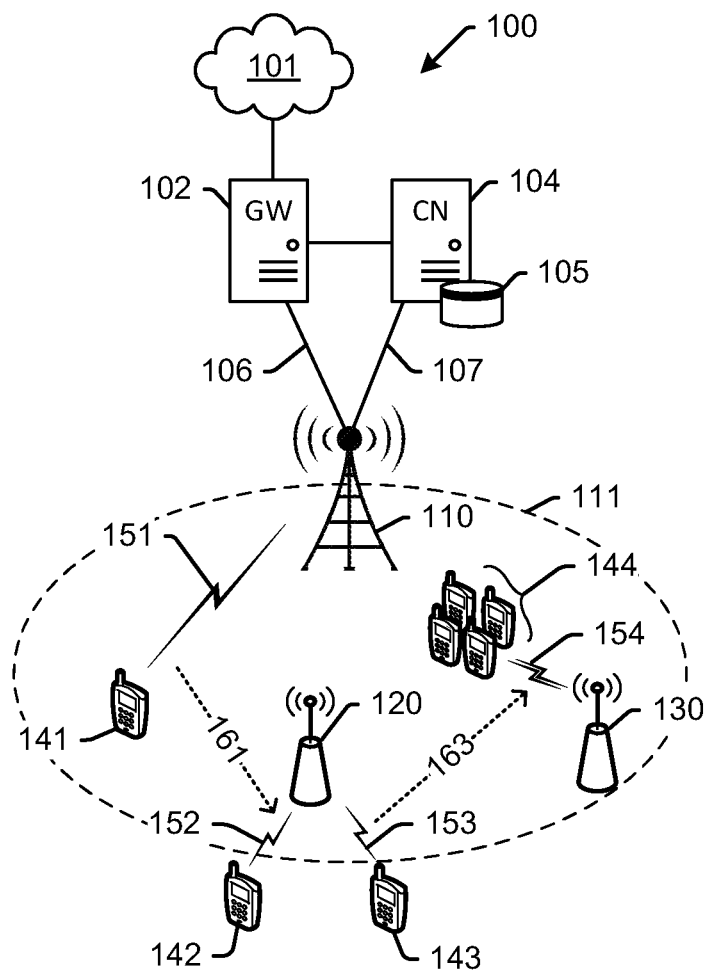
FIG. 1 depicts an exemplary system for estimating uplink interference in a wireless network.

In embodiments disclosed herein, wireless devices having available uplink resources are instructed to estimate and report uplink interference to a network node, such as an access node that is serving the wireless device. Operations disclosed herein include determining that a wireless device attached to an access node has available resources within an uplink schedule of the wireless device, and instructing the wireless device to enter a listening mode during the available resources of the uplink schedule. Determining an availability of uplink resources of a wireless device may be based on determining one or more empty resource blocks in an uplink subframe associated with each wireless device. The wireless device may be instructed to 'listen' or scan for signal levels from potentially interfering uplink signals during a portion of the empty resource blocks. One or more wireless devices may be instructed to perform estimation of interference at each of the one or more wireless devices based on an availability of uplink resources at said each wireless device. Instructing the wireless device may include transmitting an instruction to the wireless device by the serving access node via a downlink channel. For example, the instruction may be transmitted via a downlink control information (DCI) message or a radio resource control (RRC) message. The instruction can include an indication of one or more of the plurality of empty resource blocks. The wireless device can be instructed to enter the listening mode during a portion of the unused resources within the uplink subframe, during all of the unused resources, or during the entirety of an uplink subframe of the wireless device. For example, upon the unused resources meeting a threshold, the wireless device may be instructed to estimate uplink interference during an entirety of the uplink subframe.

Upon receiving the instruction to enter a listening mode, the wireless device can enable a downlink receiver of the wireless device. This is in contrast to standard operation of a wireless device in an uplink mode, wherein the wireless device would otherwise disable the downlink receiver, and instead enable an uplink transmitter. In the listening mode, the wireless device determines a measurement of an uplink interference caused at the wireless device by uplink transmissions from other wireless devices. In embodiments disclosed herein, the wireless device determines the measurement of the uplink interference based on a signal level detected at the downlink receiver during the available portion of the uplink schedule. The signal level corresponds to an interference at the wireless device. The wireless device can report the measurement of uplink interference to the network or serving access node via an uplink channel. For example, the network node (e.g., serving access node) can receive the measurement of uplink interference in a channel state information (CSI) report transmitted over an uplink channel, such as a physical uplink control channel (PUCCH) or any other shared uplink channel. The measurement of uplink interference can be received over a plurality of subframes of the uplink channel. A plurality of measures of uplink interference received over one or more subframes can be aggregated to determine an aggregate interference. The measurement may be associated with the interference. The interference may be associated with the interference with a location of the wireless device. These and additional operations are further described with respect to the embodiments depicted in FIGS. 1-5 below.

FIG. 1 depicts an exemplary system 100 for minimizing interference in a wireless network. System 100 comprises a communication network 101, gateway 102, controller node 104, access node 110, small access nodes 120 and 130, and end-user wireless devices 141, 142, 143, and 144. Access nodes 110 can be any network node configured to provide communication between wireless devices such as wireless device 140 and communication network 101. Access node 110 can be a standard macrocell access node such as a base transceiver station, a radio base station, an eNodeB device, or an enhanced eNodeB device, or the like. Small access nodes 120, 130 can be any short range, low power, small access nodes, such as a microcell access node, a picocell access node, a femtocell access node, or the like such as a home NodeB or a home eNodeB device. Further, wireless devices 141, 142, 143, 144 may be any device, system, combination of devices, or other such communication platform capable of communicating wirelessly with access node 110 and small access nodes 120, 130 using one or more frequency bands deployed therefrom. Wireless devices 141, 142, 143, 144 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with other network nodes on communication network 101. Other types of communication platforms are possible.

Small access nodes 120, 130 can be configured as relay access nodes, i.e. to relay services from access nodes 110 to end-user wireless devices 142, 143, 144. For example, access node 110 is illustrated as having coverage area 111, such that wireless device 141 can access network services directly from access node 110 via communication link 151. Wireless devices 142 and 143 are located just outside coverage area 111, and therefore are unable to attach to access node 110. Consequently, small access node 120 may be configured to relay communications between access node 110 and wireless devices 142, 143 via, for instance, communication links 152, 153 respectively. Further, although cluster of wireless devices 144 is located within coverage area 111, cluster 144 may overload access node 110, which may be serving numerous other devices that are not shown. Consequently, small access node 130 may be configured to relay communications between access node 110 and cluster 144 via wireless communication links 154. Small access nodes 120, 130 acting as relay nodes can comprise components that are further described with reference to FIG. 2.

As described above, when wireless device 141 transmits uplink signals via communication link 151, an interference 161 may be caused to communication link 152. Similarly, when wireless device 143 transmits uplink signals via communication link 153, an interference 163 may be caused to communication links 154. Such interference is particularly prevalent when communications linke 151, 152, 153, 154 utilize the same frequency or frequency bands. Moreover, although interferences 161 and 163 are shown, additional combinations of communication links and interferences may be evident to those of ordinary skill in the art in light of this disclosure.

Thus, operations disclosed herein include instructing wireless devices having available uplink resources to estimate or measure interference and transmit the estimate or measurement to the network. For example, one or more of controller node 104, access node 110 or small access nodes 120, 130 (or any other suitable network node) can be configured to determine the availability of uplink resources of wireless devices 142 and 144 (or any other wireless device), and instruct the wireless devices to perform interference estimation. Determining the availability of resources may be based on determining one or more empty resource blocks in an uplink subframe associated with each wireless device 142, 144. Wireless devices 142, 144 may be instructed to 'listen' or scan for interference 161, 163 respectively resulting from uplink signals 151, 153. The listening may occur during a portion of the empty resource blocks associated with each of wireless devices 142, 144.

Instructing the wireless devices may include transmitting an instruction to each wireless device 142, 144 by serving access nodes 120, 130 via a downlink channel utilizing communication link 152, 154 respectively. For example, the instruction may be transmitted via a downlink control information (DCI) message or a radio resource control (RRC) message. The instruction can include an indication of one or more of the plurality of empty resource blocks. Wireless devices 142, 144 can be instructed to enter the listening mode during a portion of the unused resources within the uplink subframe, during all of the unused resources, or during the entirety of an uplink subframe of the wireless device. For example, upon the unused resources of one or more of wireless devices 142, 144 meeting a threshold, said one or more wireless device may be instructed to estimate the uplink interference during an entirety of the uplink subframe.

Upon receiving the instruction to enter a listening mode, wireless devices 142, 144 can enable a downlink receiver during the scheduled uplink portions, and obtain or measure a signal level 161, 163 caused by transmissions 151, 153 respectively. For example, wireless device 142 determines the measurement of the uplink interference based on a signal level 161 detected at the downlink receiver of wireless device 142 during the available portion of the uplink schedule of wireless device 142. The signal level can include a reference signal receive power (RSRP) and/or a signal-to-interference noise radio (SINR). Alternatively or in addition, a transmit power of communication link 151 may be determined based on measured level 161.

The measurement may be reported to one or more of access nodes 120, 130 (or any other suitable network node). For example, wireless device 142 can transmit the measurement to access node 120 via an uplink portion of communication link 152. The measurement may be transmitted via a channel state information (CSI) report transmitted a physical uplink control channel (PUCCH). The measurement of uplink interference can be received over a plurality of subframes of the uplink channel. In some embodiments, wireless devices 142, 144 may perform an interference estimation based upon the signal measurement, whereas in other embodiments, wireless devices 142, 144 may transmit the measurements to one or more network nodes where the measurement may be associated with an interference. In some embodiments, wireless devices 142, 144 may be configured to transmit only signal levels that meet a threshold or fall within a predetermined range, Interference measurements reported by wireless devices 142, 144 may be associated with a location of each of wireless devices 142, 144. A plurality of measures of uplink interference received over one or more subframes can be aggregated to determine an aggregate interference. Further, interference estimations may be based on interference or signal measurements received by wireless devices in numerous locations and at various times. Estimations may be performed based on measurements obtained periodically, at specific times, or averaged over a time period. For example, interference levels 161, 163 may vary based on a time of day, and can therefore be periodically measured by wireless devices 142, 144 (or any other wireless devices at the particular location) and stored locally or on the network. In some embodiments, measurements and associations of interference estimations with locations of wireless devices 141, 142, 143, 144, along with additional information, may be stored in database 105 coupled to controller node 104, with each small access node 120, 130 requesting this information from controller node 104 to use in interference minimization.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107, may include 51 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to access node 110, small access nodes 120, 130, and wireless devices 141, 142, 143, 144, including location, signal measurements, etc. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Access node 110 can comprise a processor and associated circuitry to execute or direct the execution of computer-readable instructions to obtain information. Access node 110 can retrieve and execute software from storage, which can include a disk drive, a flash drive, memory device, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 110 can receive instructions and other input at a user interface. Access node 110 communicate with gateway node 102 and controller node 104 via communication links 106, 107.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, small access nodes 120, 130, and communication network 101

Figure 2:
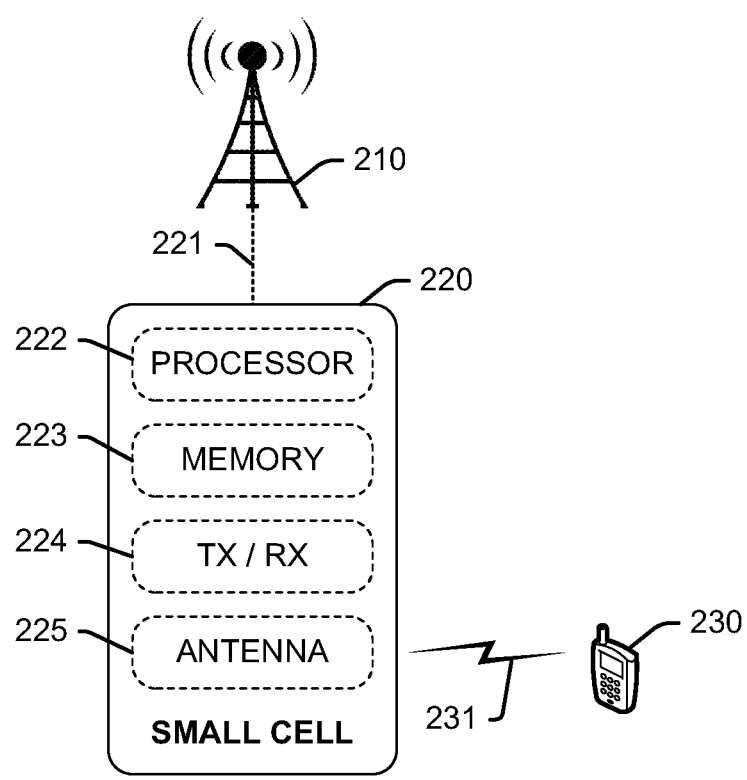
FIG. 2 depicts components of an exemplary small access node for estimating uplink interference in a wireless network.

FIG. 2 depicts components of an exemplary small access node 220. Small access node 220 comprises a processor 222, a memory 223, a transceiver 224, and an antenna 225. Small access node 220 is illustrated as relaying network services between access node 210 (via communication link 221) and wireless device 230 (that attaches to antenna 225 via communication link 231). Although only one transceiver is depicted in small access node 220, additional transceivers may be incorporated in order to facilitate communication across link 221 and other network elements. Moreover, memory 223 can store logical instructions that are executed by processor 222 to perform numerous operations as described herein, such as those described with respect to FIG. 3 below.

Figure 3:
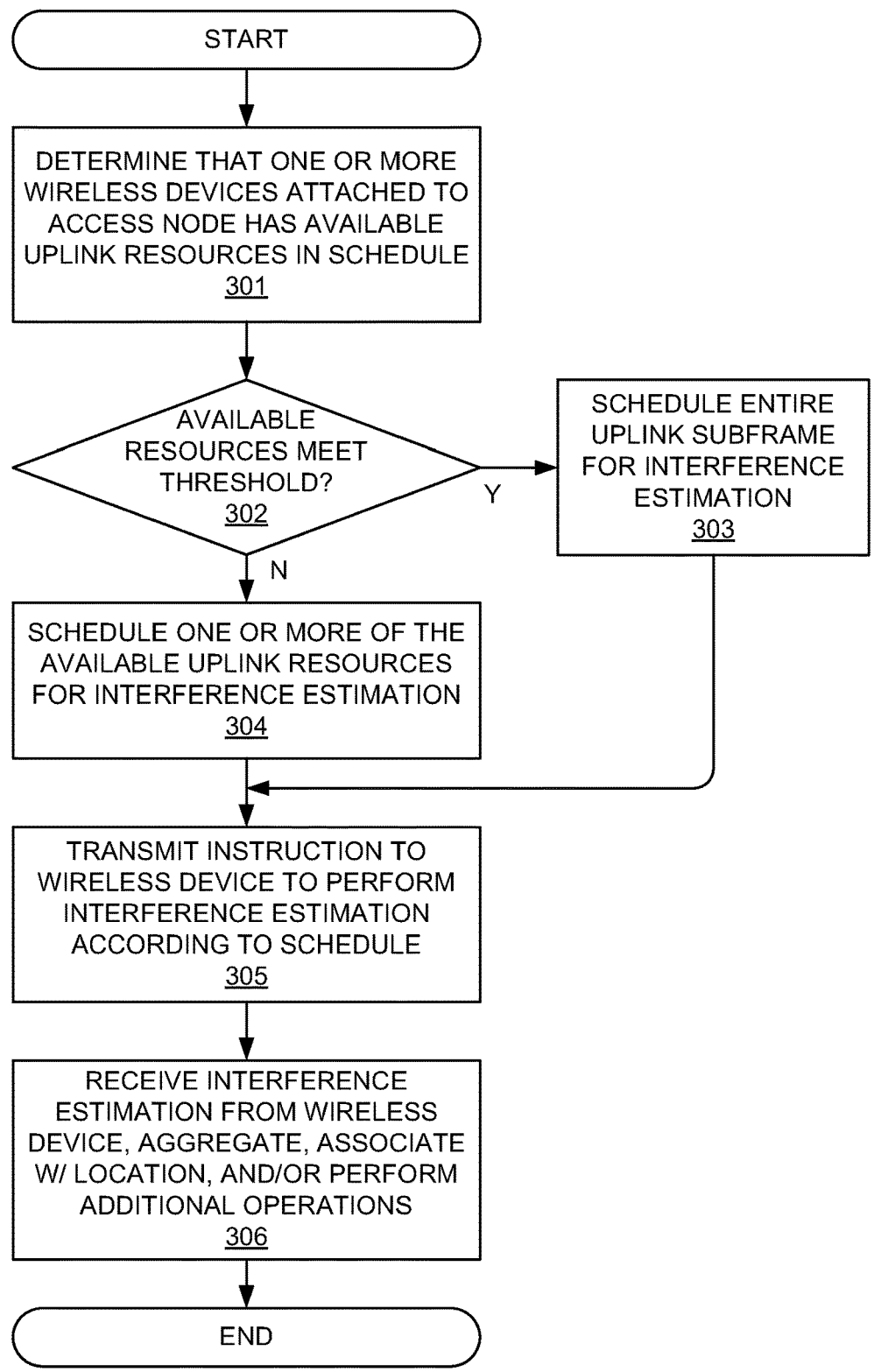
FIG. 3 depicts an exemplary method for estimating uplink interference in a wireless network.

FIG. 3 depicts an exemplary method for estimating uplink interference in a wireless network. The method of FIG. 3 is generally discussed with reference to components depicted in FIG. 1 and/or FIG. 2. For example, the method comprises operations that may be performed by one or more of small access nodes 120, 130, 220, or access nodes 110, 210, or controller node 104. In other embodiments, the method can be implemented with any suitable network element. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The method begins at 301, wherein a wireless device attached to an access node is determined to have available resources within an uplink schedule of the wireless device. Determining an availability of uplink resources of a wireless device may be based on determining one or more empty resource blocks in an uplink subframe associated with each wireless device. A comparison 302 with a threshold is performed, in order to determine how many of the available resources of the uplink schedule are to be used to perform interference estimation operations. For example, in both of steps 303 and 304, a revised schedule may be generated for the wireless device to 'listen' or scan for signal levels from potentially interfering uplink signals. If the available resources do not meet a threshold at 302, the wireless device can be scheduled to enter the listening mode during a portion of the unused resources within the uplink subframe, or during all of the unused resources, at 304. If the available resources meet the threshold at 302, the wireless device may be scheduled to estimate uplink interference during an entirety of the uplink subframe.

At 305, an instruction is transmitted to the wireless device along with the revised schedule. The instruction may be transmitted to the wireless device by a serving access node via a downlink channel. For example, the instruction may be transmitted via a downlink control information (DCI) message or a radio resource control (RRC) message. The instruction can include an indication of one or more of the plurality of empty resource blocks. Upon receiving the instruction to enter a listening mode, the wireless device can enable a downlink receiver of the wireless device. This is in contrast to standard operation of a wireless device in an uplink mode, wherein the wireless device would otherwise disable the downlink receiver, and instead enable an uplink transmitter. In the listening mode, the wireless device determines a measurement of an uplink interference caused at the wireless device by uplink transmissions from other wireless devices. The wireless device may determine the measurement of the uplink interference based on a signal level detected at the downlink receiver during the available portion of the uplink schedule. The signal level corresponds to an interference at the wireless device.

At 306, the interference estimation and/or the measured signal level is received from the wireless device. For example, the wireless device can report the measurement of uplink interference, or a locally-performed determination of interference, to the network or serving access node via an uplink channel. The measurement of uplink interference may be received in a channel state information (CSI) report transmitted over an uplink channel, such as a physical uplink control channel (PUCCH) or any other shared uplink channel. The measurement of uplink interference can be received over a plurality of subframes of the uplink channel. A plurality of measures of uplink interference received over one or more subframes can be aggregated to determine an aggregate interference. The measurement may be associated with the interference. The interference may be associated with the interference with a location of the wireless device. Further at 306, additional operations may be performed based on the received interference. For example, upon the interference (or signal level measurement) meeting a threshold, the neighboring access node is tagged as a potential interferer, and interference minimization operations can be performed based thereon. Moreover, the measurement and characteristics of the neighbor access nodes and interfering signals associated therewith may vary based on a time of day, and can therefore be periodically measured or retrieved, stored, and averaged over a period of time. Consequently, each neighboring access node can refer to locally-stored characteristics when it performs interference minimization operations as needed.

FIGS. 4A-4B depict an exemplary small access node 420 for estimating uplink interference from a neighboring small access node 430. Small access node 420 is illustrated as providing network services to wireless devices 440 and 450, while small access node 430 is illustrated as providing network services to wireless device 460. As depicted in the embodiment of FIG. 4A, small access node 420 is engaged in a downlink communication with wireless devices 440, 450, via downlink channels 441, 451 respectively. Small access node 420 schedules downlink transmissions for wireless devices 440, 450 using exemplary downlink subframe 480, which may be a time-division (TD) LTE subframe comprising two slots 481. Each wireless device 441, 451 is scheduled for downlink transmission within subframe 480. Further, small access node 430 is engaged in any type of communication link 461 (i.e. downlink or uplink) with wireless device 460. If wireless device 460 is performing an uplink transmission, wireless device 450 (and possibly wireless device 440) may experience an uplink interference. Thus, as described herein, wireless device 450 can be instructed to utilize any available uplink resources to perform a signal measurement and/or interference estimation, and transmit the interference and/or estimation to access node 420.

FIG. 4B depicts small access node 420 engaged in an uplink communication with wireless devices 440, 450, via uplink channels 442, 452 respectively. In this embodiment, an exemplary uplink subframe 480 comprises slots 483, 484, during which wireless device 440 is configured to transmit uplink information via uplink channel 442, and wireless device 450 is not scheduled to transmit any uplink information. Consequently, wireless device 450 is instructed to 'listen' to a signal level or interference 462 caused by an uplink transmission 461 from wireless device 460. The instruction to listen may be transmitted via the downlink subframe 480 (or any other downlink subframe), and can be accompanied by an identifier of subframes (or resources therein) for wireless device 450 to perform the listening. For example, wireless device 450 performs the listening during slot 483. Wireless device 450 is further configured to transmit its measurements to small access node 420 via an uplink transmission 452. Uplink transmission 452 can include any type of uplink transmission, such as via a control channel (i.e. PUCCH) or shared channel (PUSCH) of subframe 482. Uplink transmission 452 can be scheduled as requested by wireless device 450, such as during slot 484. Further, uplink transmission 452 (comprising measurements and/or interference estimations) can be transmitted over several resource blocks spanning a plurality of subframes.

The methods, systems, devices, networks, access nodes, and equipment described above may be implemented with, contain, or be executed by one or more computer systems and/or processing nodes. The methods described above may also be stored on a non-transitory computer readable medium. Many of the elements of FIGS. 1, 2, and 4 may be, comprise, or include computers systems and/or processing nodes. This includes, but is not limited to: access node 110, small access nodes 120, 130, 220, 420, 430, controller node 104, and/or network 101.

Figure 5:
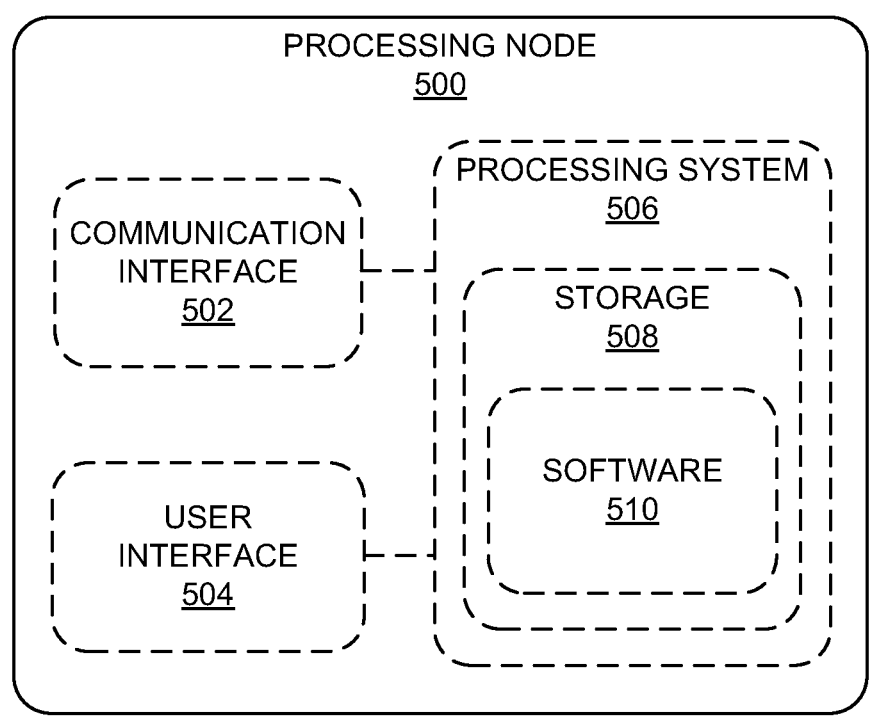
FIG. 5 depicts an exemplary processing node for estimating uplink interference in a wireless network.

FIG. 5 depicts an exemplary processing node 500 comprising communication interface 502, user interface 504, and processing system 506 in communication with communication interface 502 and user interface 504. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. For example, storage 508 may include a buffer. Software 510 may include computer programs, firmware, or some other form of machine-readable instructions, including an operating system, utilities, drivers, network interfaces, applications, or some other type of software. For example, software 510 may include a module for determining a preferred donor access node, as described herein. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements.

User interface 504 permits the configuration and control of the operation of processing node 500.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for estimating uplink interference in a wireless network, the method comprising:
   determining that a wireless device attached to an access node has available resources within an uplink schedule of the wireless device;
   comparing the available resources within the uplink schedule with a threshold;
   upon determining that the available resources exceed the threshold, instructing the wireless device to enter a listening mode during an entirety of the uplink schedule, wherein in the listening mode, the wireless device determines a measurement of an uplink interference caused at the wireless device;
   upon determining that the available resources are less than the threshold, instructing the wireless device to enter the listening mode during a portion of the available resources within the uplink schedule; and
   receiving the measurement of the uplink interference from the wireless device via an uplink channel.

2. The method of claim 1, wherein the available resources within the uplink schedule comprise a plurality of empty resource blocks.

3. The method of claim 2, wherein the portion of the available resources comprises one or more resource blocks from the plurality of empty resource blocks.

4. The method of claim 2, further comprising instructing the wireless device to enter the listening mode during each of the plurality of empty resource blocks.

5. The method of claim 1, wherein instructing the wireless device further comprises transmitting an indication of one or more of the plurality of empty resource blocks via a downlink control information (DCI) message.

6. The method of claim 1, wherein instructing the wireless device further comprises transmitting an indication of one or more of the plurality of empty resource blocks via a radio resource control (RRC) message.

7. The method of claim 1 wherein, in the listening mode, the wireless device enables a downlink receiver of the wireless device.

8. The method of claim 7 wherein, in the listening mode, the wireless device determines the measurement of the uplink interference based on a signal level detected at the downlink receiver during the available portion of the uplink schedule.

9. A system for estimating uplink interference in a wireless network, the system comprising:
   an access node; and
   a processor coupled to the access node, the processor for configuring the access node to perform operations comprising:
   determining available uplink resources of one or more wireless devices;
   comparing the available uplink resources with a threshold;
   upon determining that the available uplink resources at a first wireless device exceed the threshold, instructing the first wireless device to measure an uplink interference at the first wireless device during an entirety of the available uplink resources; and
   upon determining that the available uplink resources at a second wireless device do not exceed the threshold, instructing the second wireless device to measure an uplink interference at the second wireless device during a portion of the available uplink resources; and
   receiving a measurement of uplink interference from each wireless device,
   wherein each wireless device determines the measurement of uplink interference by activating a downlink receiver.

10. The system of claim 9, wherein the operation further comprise determining the availability of uplink resources of each wireless device based on determining one or more empty resource blocks in an uplink subframe associated with each wireless device.

11. The system of claim 9, wherein receiving the measurement of uplink interference comprises receiving a channel state information (CSI) report over an uplink channel.

12. The system of claim 11, wherein the uplink channel comprises a physical uplink control channel (PUCCH).

13. The system of claim 11, wherein the uplink channel comprises a shared uplink channel.

14. The system of claim 11, wherein the measurement of uplink interference is received over a plurality of subframes of the uplink channel.

15. The system of claim 14, wherein the uplink interference received over the plurality of subframes is aggregated to determine an aggregate interference.

16. A processing node for estimating uplink interference in a wireless network, the processing node being configured to perform operations comprising:
   determining unused resources within an uplink subframe associated with a wireless device attached to an access node;
   comparing the unused resources with a threshold;
   upon determining that the unused resources within the uplink subframe are less than the threshold, instructing the wireless device to measure the received signal level during a portion of the unused resources within the uplink subframe;
   upon determining that the unused resources exceed a threshold, instructing the wireless device to measure a received signal level during an entirety of the uplink subframe; and
   receiving the signal level measured by the wireless device at the access node,
   wherein the signal level corresponds to an interference at the wireless device.

17. The processing node of claim 16, further comprising associating the received signal level with the interference.

18. The processing node of claim 17, further comprising associating the interference with a location of the wireless device.

* * * * *